United States Patent [19]

Hooykaas, Carel W. J.

[11] Patent Number: 4,764,216

[45] Date of Patent: Aug. 16, 1988

[54] METHOD OF CONVERTING PARTICLES LIBERATED IN CHEMICAL OR PHYSICAL PROCESSES INTO A HARMLESS FORM BY MIXING WITH A MOLTEN SILICATE-CONTAINING MATERIAL

[75] Inventor: Hooykaas, Carel W. J., Rotterdam, Netherlands

[73] Assignee: Pelt & Hooykaas B.V., Netherlands

[21] Appl. No.: 798,489

[22] Filed: Nov. 15, 1985

[30] Foreign Application Priority Data

Nov. 15, 1984 [NL] Netherlands ............... 8403501

[51] Int. Cl.$^4$ ............................................. C04B 05/00
[52] U.S. Cl. ............................. 106/117; 106/DIG. 1; 501/155
[58] Field of Search ............... 106/117, DIG. 1; 501/155

[56] References Cited

U.S. PATENT DOCUMENTS

| | | | |
|---|---|---|---|
| 4,015,997 | 4/1977 | Selmeczi et al. | 106/117 |
| 4,272,293 | 6/1981 | Hooykaas | 501/155 |
| 4,300,985 | 11/1981 | Gagneraud | 106/117 |
| 4,404,105 | 9/1983 | Rysman de Lockente et al. | 106/117 |
| 4,539,121 | 9/1985 | Kapland et al. | 106/117 |

FOREIGN PATENT DOCUMENTS

| | | | |
|---|---|---|---|
| 53-58530 | 5/1978 | Japan | 106/117 |
| 53-58966 | 5/1978 | Japan | 106/117 |
| 53-33967 | 9/1978 | Japan | 106/117 |
| 54-47891 | 4/1979 | Japan | 106/117 |
| 55-167077 | 12/1980 | Japan | 106/117 |

*Primary Examiner*—William R. Dixon, Jr.
*Assistant Examiner*—Ann M. Knab
*Attorney, Agent, or Firm*—Arnold S. Weintraub

[57] ABSTRACT

A method of converting particles liberated in chemical or physical processes, such as fly ash, metal processing sludge particles obtained in the preparation of metals or metal compound, or particles of electroplating sludge, are made harmless by preheating these particles to at least 600° C. and then mixing same with a molten slag material, whereafter the mixture is solidified and broken.

Preferably, the particles are preheating to their softening point or are molten.

Noxious products, such as metals, being present in said particles cannot be leached out from the broken solidifed composition.

9 Claims, No Drawings

4,764,216

METHOD OF CONVERTING PARTICLES LIBERATED IN CHEMICAL OR PHYSICAL PROCESSES INTO A HARMLESS FORM BY MIXING WITH A MOLTEN SILICATE-CONTAINING MATERIAL

BACKGROUND OF THE INVENTION

Field of the Invention

The present invention relates to a method of converting of particles liberated in chemical or physical processes into harmless form by mixing these particles with molten silicate-containing material, after which the mixture as obtained is allowed to solidify and is, if desired, reduced in size.

A method of this type is known. In this method dust particles containing for example, zinc, cadmium and/or copper and/or possibly other metals and being liberated in feeding ore granules obtained by pelletization to a blast furnace are made harmless by mixing with a liquid stream of metallurgical slag material tapped off from a blast furnace. The dust particles are added in a quantity of 25% based on the stream of slag material.

The trapping in said manner of dust particles being generated in the reduction of a phosphate-containing ore with carbon in a chemical furnace and mixing them in an amount of 25% with liquid phosphorus-furnace slag are also known.

In using these amounts of dust particles the collected particles as added melt completely in the molten slag material.

A drawback of this method is that if powdery materials comprising particles being very voluminous and/or having very porous surface structure are used, only relatively small amounts of particles can be absorbed in the slag if it is desired to allow the particles to melt in the slag or if this melting requires a long time.

As examples of such particles, particles obtained by drying sludge from electroplating processes, sludge from the preparation of metal or metal hydroxide, fly ash and the like may be cited.

As a result of the air being present around said particles or occluded in the masses of said particles, said particles have particularly the tendency only to be well absorbed at the interface between molten silicate-containing material and the particles.

It even occurs frequently that as a result of the sudden heating up of the air being present around the particles, said particles are "blown away" from the surface of the slag or even out of the slag mass.

SUMMARY OF THE INVENTION

It is now the main object of the invention, to provide a method which does not present this drawback and, particularly, flaky particles which only melt slowly in a molten silicate-containing material after mixing with said particles can in fact be absorbed in large amounts in a molten silicate-containing material.

This object is achieved by the invention in that the particles are preheated, preferably to at least 600° C., before being mixed with said molten silicate-containing material.

By preheating the particles will melt more rapidly on mixing with a molten silicate-containing material, as a result of which very large amounts of such particles can be rapidly absorbed in a molten slag.

In general, the particles to be absorbed in the molten silicate-containing material will have a maximum dimension being at most 5 mm.

Advantageously the particles are preheated to their softening point. In this manner a very rapid melting of particles added to a molten silicate-containing material is obtained.

Preferably, the particles are made to melt, and thereby the advantage is obtained that essentially two molten materials have to be mixed with each other, namely the molten particles and the molten silicate-containing material mass, which mixing proceeds very rapidly in view of the fact that two liquid masses are mixed with each other.

In a very advantageous embodiment of the method according to invention the heat required for the preheating the particles to be converted is provided by the silicate-containing material before or after mixing with the preheated particles.

Preheating may take place by means of the heat which is given off by the molten silicate-containing material before mixing with the particles, but also by means of the heat provided by the material formed from a previously prepared mixture of silicate-containing material and preheated particles after solidification and further cooling.

In the abovementioned manner, after collection, the particles can be completely absorbed in molten silicate containing material from which they cannot be leached out so that any environmental contamination by harmful compounds (such as harmful metals or harmful metal compounds) present in such escaping particles is prevented.

The molten silicate-containing material is preferably a molten metallurgical slag material particularly blast furnace slag which offers the great advantage that the collected particles can be made harmless by means of a material being available in large excess.

The method according to the invention allows e.g. to mix up to 30 parts by weight of the preheated particles in the molten state with 70 parts by weight of molten silicate-containing material, and thereby obtaining a material from which after solidification the particles or compounds present in these particles can no longer be leached out.

If desired, anti sliding promoting stabilizers such as grains of sand, particles of corundum, or similar particles may be added to the molten mass of particles and molten silicate-containing material.

It is also possible to break up the melt obtained after solidification and to subject the broken particles to an anti sliding promoting surface treatment.

Although reference is always made in the above to fly ash particles and dried metal sludge particles, it will be clear that the method according to the invention is also suitable for processing other particles, but as stated hereinbefore, the method of the invention is particularly suitable for making voluminous or flaky particles trapped or collected in physical or chemical processes harmless.

THE DESCRIPTION OF THE PREFERRED EMBODIMENTS

EXAMPLE I 1000 kg of molten blast-furnace slag are mixed with 1000 kg of fly ash particles preheated to 900° C.

Comparison with a same experiment using the same amount of non-preheated fly ash particles, proves that in the latter case the period necessary for completely melting the fly ash particles longer in the molten blast-furnace slag is four times longer.

EXAMPLE II 1000 kg of molten blast-furnace slag at a temperature of 1400° C. are mixed with 1000 kg of molten flag ash particles. The mixing of the molten masses proceeds virtually instantaneously, so that a significant gain in time may be achieved in making the fly ash particles harmless.

EXAMPLE III 500 kg of molten blast-furnace slag at a temperature of 1400° C. are mixed with 1000 kg of molten fly ash particles.

After cooling a solidified mass is obtained from which no harmful metals can be leached out after breaking.

EXAMPLE IV 500 kg of molten blast furnace slag at a temperature of 1400° C. are mixed with 1000 kg of molten metal processing sludge particles.

After cooling a solidified mass is obtained from which no harmful metals can be leached out after breaking.

What is claimed is:

1. A method of converting high volumes of powdery porous particulate material liberated in chemical or physical processes into a harmless form, said method comprising the steps of:
   first, pre-heating the porous particulate material to a temperature above about 600° C., thereby increasing the temperature of the particulate material to a softening point of the particulate material;
   second, mixing the heated particulate material with a molten slag material; and then
   allowing the resulting mixture to solidify into a harmless form.

2. Method according to claim 1, characterised in that the particulate material are preheated to their softening point.

3. Method according to claims 1, characterised in that the particulate material are made to melt.

4. Method according to claim 1, characterized in that the particulate material is chosen from a group consisting of fly ash, and a dried metal-containing sludge.

5. Method according to claims 1 inclusive, characterised in that the particulate material have a maximum dimension of at most 5 mm.

6. Method according to claim 1, characterised in that the heat required for preheating the particulate material to be converted is provided by the molten, slag material, before or after mixing with the preheated particulate material.

7. A method of converting powdery materials comprised of porous particles liberated in chemical or physical processes into a harmless form, said method comprising the steps of:
   first, pre-heating the porous particles with heat given off from a molten slag material to a temperature above about 600° C., thereby increasing the temperature of the powdery materials to a softening point of the powdery materials;
   second, mixing the heated particles with the molten slag material; and then
   allowing the resulting mixture to solidify into a harmless form, wherein the porous particles have a maximum dimension of 5 millimeters.

8. A method of converting fly ash into a harmless form, said method comprising the steps of:
   first, pre-heating the fly ash porous particles using heat from a molten slag material to a temperature above about 600° C., thereby increasing the temperature of the porous particles to a softening point of the particulate material;
   second, mixing the heated particles with the molten slag material; and then
   allowing the resulting mixture to solidify into a harmless form, wherein the fly ash particles have a maximum dimension of 5 millimeters.

9. A method of converting dried metal-containing sludge comprised of porous particles into a harmless form, said method comprising the steps of:
   first, pre-heating the dried metal-containing porous particles using heat from a molten slag material to a temperature above about 600° C., thereby increasing the temperature of the porous particles to a softening point of the particulate material;
   second, mixing the heated particles with the molten slag material; and then
   allowing the resulting mixture to solidify into a harmless form, wherein the fly ash particles have a maximum dimension of 5 millimeters.

* * * * *